July 24, 1956
A. J. JANIK
2,756,061
QUICK ACTING CHUCKING TOOL
Filed June 8, 1955
3 Sheets-Sheet 1
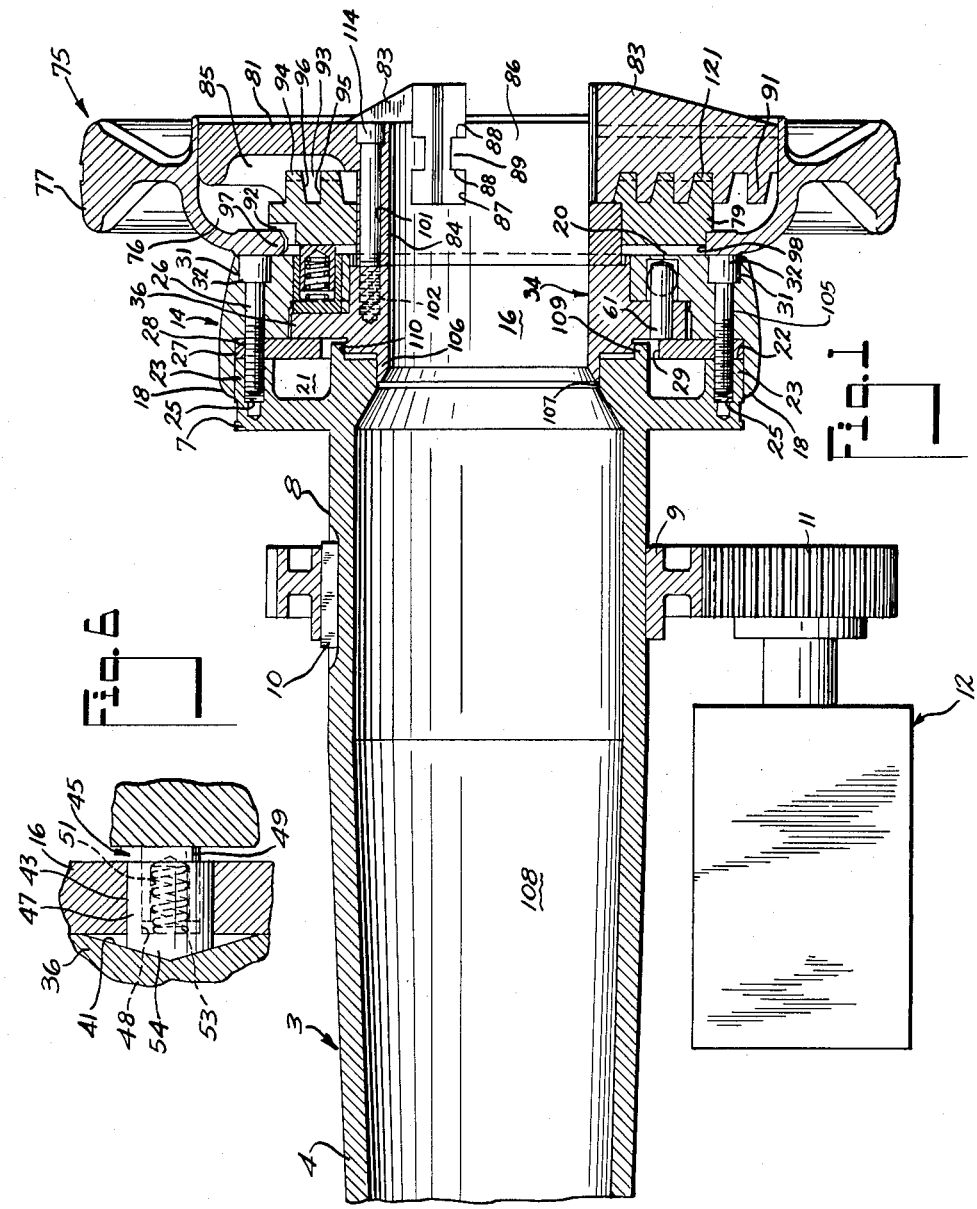
INVENTOR.
ANTON J. JANIK
BY J. D. Douglas
HIS ATTORNEY

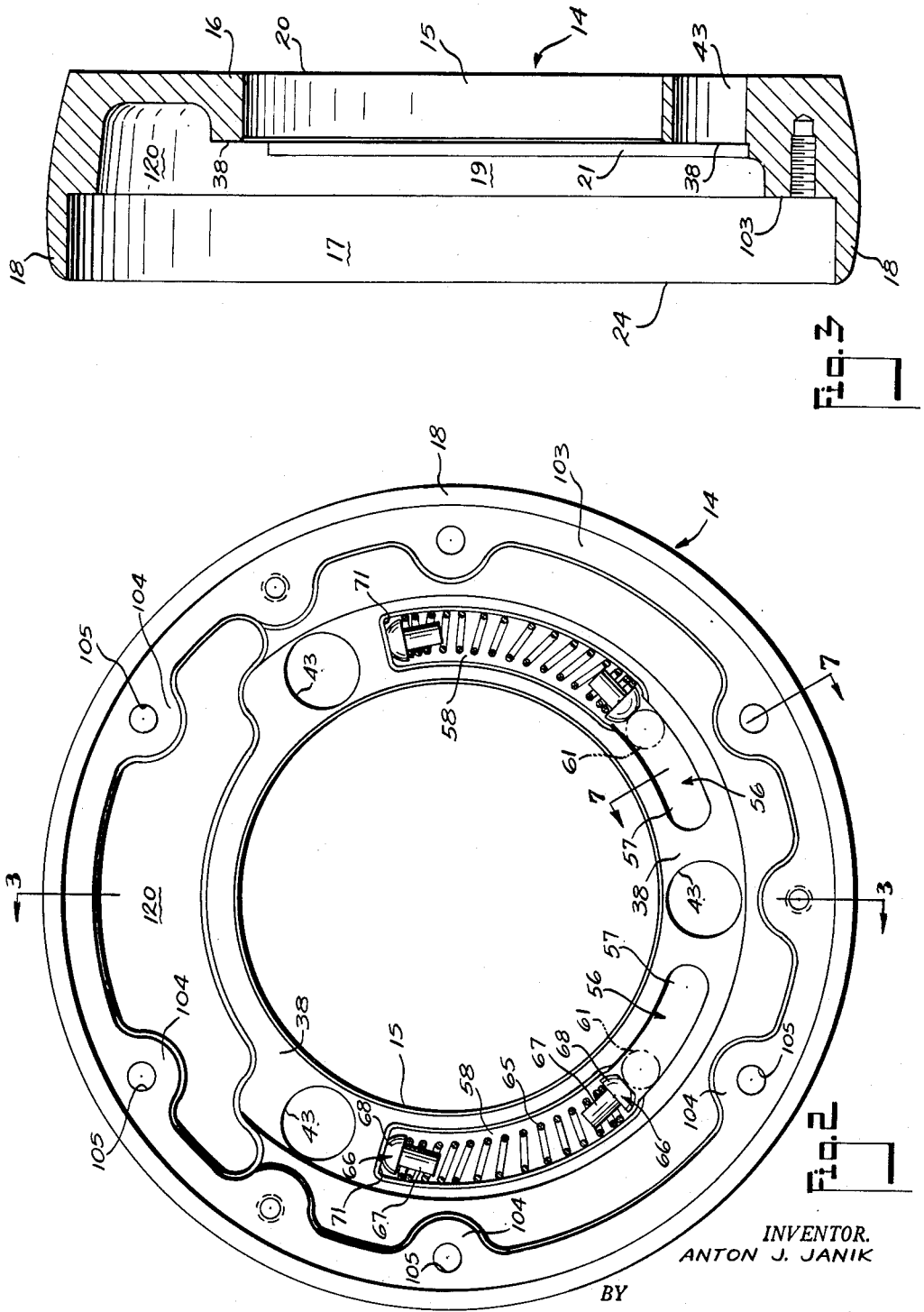

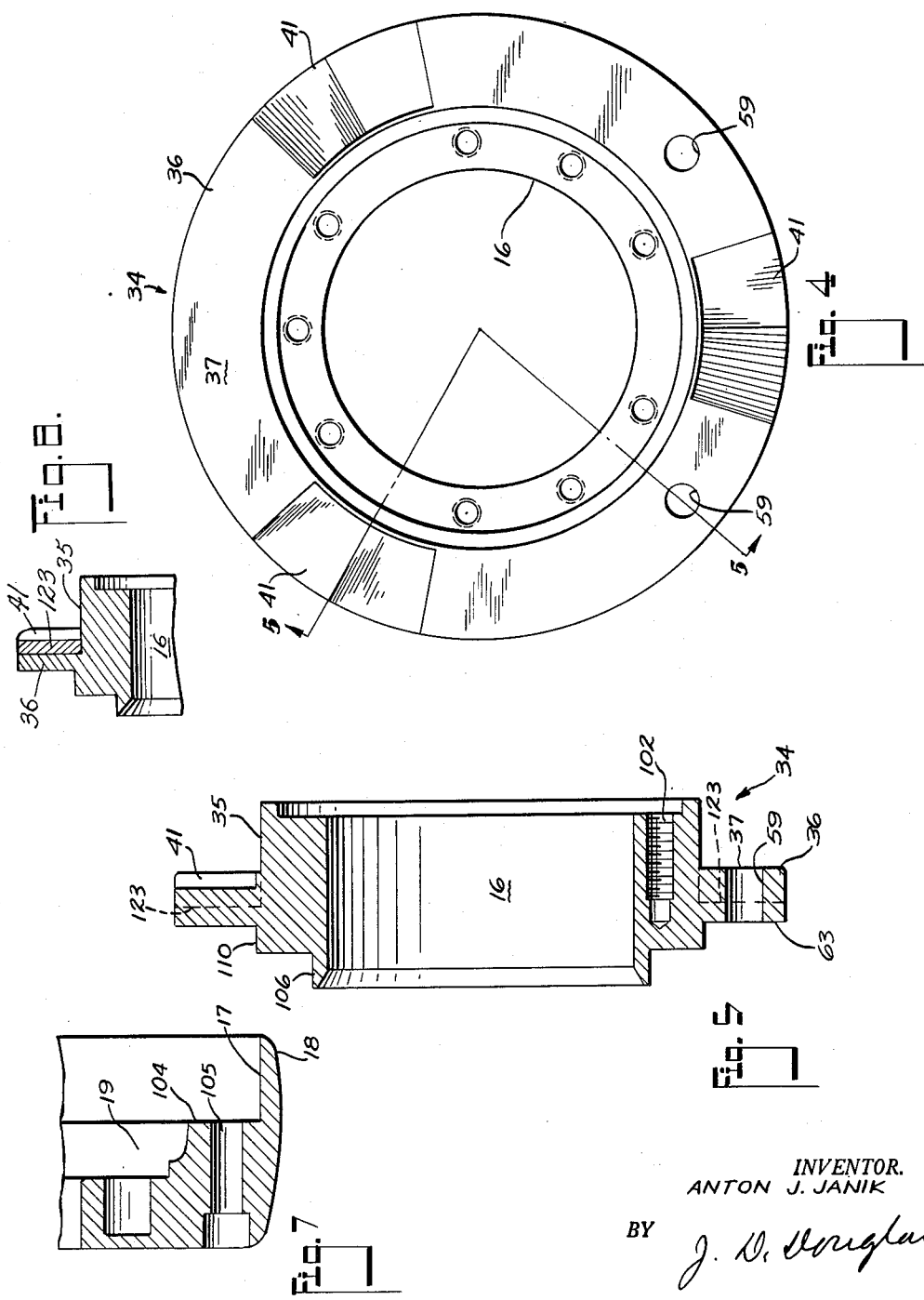

United States Patent Office 2,756,061
Patented July 24, 1956

2,756,061

QUICK ACTING CHUCKING TOOL

Anton J. Janik, Elyria, Ohio, assignor to The Ridge Tool Company, Elyria, Ohio

Application June 8, 1955, Serial No. 514,021

8 Claims. (Cl. 279—114)

This invention relates to chucking devices for holding cylindrical pipe or like bodies, while work is performed thereon, and more particularly to improvements in hand operated chucking devices having a self-tightening action.

The class of device referred to herein is similar in principle to that disclosed in my copending application Serial No. 386,814, filed October 19, 1953.

Heretofore in the usual type of chuck used, the workpiece was inserted into the device and secured therein by means of a plurality of jaws or a collet forced along the axis of the chuck and engaging the outer surface of the workpiece. The manual power to force the jaws toward the axis of the chuck is usually applied by means of a chuck wrench or similar tool. Very often the operator fails to remove the wrench, after the restraining operation is completed, and as a result, injuries to the operator or others in proximity to the device are sustained, when the machine to which the chuck is attached, is put into operation and the wrench flies out.

Another problem paramount to those persons who are engaged in the various occupations which have need for such a device is the high ratio of scrap material produced, partially due to the low efficiency of the holding mechanism of the chuck since it is realized that if the manual force applied is not of sufficient magnitude the pipe will come loose during the rotation of the chuck, and also because of the resistive force applied by the cutting tool which tends to loosen the pipe in the chuck.

The device of the present invention, by a combination of manually and automatically applied forces to secure the workpiece, has provided a means by which a decided increase in both quantity and quality of production is accomplished, and also a more safe and versatile device is realized.

Another advantage of my invention resides in the fact that regardless of the rotational motion of the primary power source, my device is equally efficient to close the chuck in either direction of rotation.

Another advantage of my invention is that the chucking tool is a self contained device whereby it may be attached to any suitable rotatable shaft of a machine tool.

Still further advantages of the invention will be realized by those familiar with the art and a more thorough understanding will be realized by reference to the accompanying description of an embodiment thereof, which description is illustrated by the drawings herein and included as a part of this specification.

In the drawings:

Fig. 1 is a side view shown partly in section of the chucking device embodying my invention;

Fig. 2 is a plan view of the adapter ring and associated elements thereof;

Fig. 3 is a sectional view taken along lines 3—3 of Fig. 2;

Fig. 4 is a plan view of the drawing plate;

Fig. 5 is a vertical sectional view of the driving plate taken along lines 5—5 of Fig. 4;

Fig. 6 is a fragmentary sectional view showing the relationship between the driving plate, one drive cam and drive pin and scroll plate;

Fig. 7 is a fragmentary sectional view taken along lines 7—7 of Fig. 2; and

Fig. 8 is a fragmentary sectional view of another embodiment of the driving plate.

Briefly the invention contemplates a chuck having movable jaws operated by a scroll plate. The scroll plate may partake of a movement relative to the jaws such that the land in the scroll plate moves away from complete meshing engagement with the teeth in the jaws. Means are provided for translating torque necessary to a cutting operation into a movement of the scroll plate so that the land more completely meshes with the teeth in the jaws and the relationship between the land, and the jaw teeth is such that, as a more complete meshing is effected, a greater inward or chucking force is applied to the jaws.

Referring now to the drawings in which like elements are designated by like reference characters, a hollow shaft 3, Fig. 1, having a tapering cylindrical portion 4 at one end, a round flange 7, and juxtaposed to the flange, a bearing surface 8, serves as a means upon which the components comprising the invention may be located. A driving gear 9, may be keyed to the shaft at 10 over the bearing surface 8 and is in meshing engagement with a pinion 11, which in turn delivers torque from a drive mechanism 12 to provide rotational movement for said chucking tool.

A plurality of threaded holes 25, in equal spaced relationship are placed in a peripheral boss 23, defined by the periphery of the flange 7, and a circumferential groove 21, located in the face 22 of said flange, and extend inwardly therein.

A circular spacer plate 27, having a plurality of three holes 28, and a centrally disposed aperture 29, is placed against the face 22 of the flange 7 in such manner that said holes 28 are directly in line with holes 25 in the flange 7.

A disk-type adapter plate 14, Figs. 2 and 3, having a centrally disposed aperture 15, beginning on one face 20, and extending into the plate, and a plurality of shallow, circular concavities 17, 19 and 21, of successive diminishing diameters, being axially disposed in adjacent relationship to each other, beginning on the opposite face 24 of said plate, and extending toward and connecting to said aperture 15, is adapted to receive a drive plate 34. The drive plate 34, comprises a central hub 35 having an axial bore 16 and a circular flange 36 formed at the mid-portion of said hub, and extending radially outward therefrom.

The drive plate 34 is inserted into the adapter plate 14 in such manner that the hub 35 extends into aperture 15, and the flange 36 resides within adjacent concavities 19 and 21, and one face 37 of said flange lies juxtaposed to an annular seat 38 formed at the interconnecting plane of aperture 15 and concavity 21 in the adapter plate.

A plurality of radially extending V-shaped grooves 41, or cam faces being in equal spaced relation to each other, are formed on the face 37 of the flange 36 of the drive plate 34.

As will be apparent although I have shown the cams as groups of three it is possible and practicable to use two cams to a group, or more than this may be used in a group.

It is also possible to only use one such cam although it is not as desirable as two or more.

I have also shown the drive plate 34 as being comprised of one integral body, but it is apparent that the thickness of the flange 36 could be made less, and a ring 123, having the grooves or cam faces 41 formed thereon, could be placed over the face 37 of the flange, and rigidly secured thereto. This particular construction is illustrated in Fig. 8.

A plurality of holes 43, in equal spaced relationship, are placed in the annular seat 38, of the adapter plate 14, dividing said seat into equal segments, and extend through the hub 16 to the face 20 of the plate. The construction of Fig. 2 shows three holes being placed in the hub 16, but it is understood that the number selected is merely for the purpose of illustration, and is not intended to limit the scope of the applicant's principle of operation.

The holes 43 are located in said seat 38 so that their centers are in the same circumferential plane as the V-shaped cams, when the drive plate 34 is inserted into the adapter plate 14.

A composite cylindrical driving pin 45, Fig. 6, comprising of a head part 47, having an internal cylindrical bore 48, a tail part 49, slidably disposed in said bore and having a blind hole 51 formed axially therein, a spring member 53 interposed between said parts and seated within said bore 48 and blind hole 51, is placed within each hole 43 and extends into and through the hub 16 with the front of the head part 47 being seated within the V-shaped cam face 41. The front of the head part 47 is formed into a wedge shaped point 54, similar in configuration to the V-shaped cam face 41.

A pair of elongated, radially extending grooves 56, Figs. 2 and 7, being substantially rectangular in cross-section, are formed in adjacent segments on the annular seat 38, and are equally spaced between the holes 43 defining said segments. Each groove is comprised of two adjacent connected channels, namely: pin channel 57, and spring channel 58.

A pair of holes 59 are placed in the flange 36 of the drive plate 34, and extend longitudinally completely therethrough on opposite sides of one of the V-shaped cams 41, as shown in Fig. 4, and are in the same circumferential plane as the pin channels 57 of the grooves 56, in the adapter plate 14, when the drive plate is inserted therein.

Cylindrical pins 61, Fig. 1, are passed into the holes 59 in such manner that one end of the pins are flush with face 63 of the flange 36, with the remaining portions thereof, extending through the flange and outwardly thereof, from the opposite face 37 of the flange.

A spring assembly, comprising an elongated helical spring 65, and a plug 66 on each end thereof is placed within each arcuate spring channel 58. The end turns of said spring embrace the shank 67, of the plug 66, and engage the underside of cap 68 on one end of each plug 66.

When the drive plate 34 is inserted into the adapter plate 14, the outwardly extending portion of each pin 61 resides in the pin channel 57 of groove 56, and engages the cap 68 of one of the plugs 66.

The opposite plug 66 of each spring assembly is slidable through the spring channel 58 and engageable with its end wall 71. Each spring assembly, therefore, is seen to be flexible between the end wall 71 of channel 58, and the pin 61 attached to the drive plate 34.

An annular seat 103, Fig. 3, formed at the intersecting plate of concavities 17 and 19 of the adapter plate 14, has a plurality of bosses 104, in equal spaced relation, formed integrally therewith, and extending radially toward the center of the adapter plate 14.

A hole 105 is placed in each boss 104, extending longitudinally through the adapter plate, and is in the same circumferential plane as the threaded holes 25 on the shaft 3, and the holes 28 in the spacer plate 27.

When the adapter plate 14, having the drive plate 34 inserted therein, is placed against the spacer plate 27, Fig. 1, a peripheral rim 18, formed on the adapter plate, and defined by the periphery of the concavity 17 and the outer surface of the adapter plate, closely embraces the spacer plate 27 and a portion of the flange 7 of the shaft 3. A central portion 106 of flange 35, of the drive plate 34 is slidably journalled in an aperture 107, which provides an opening to the interior 108 of the shaft 3, and an annular rim 109 on the flange 7 embraces a bearing surface 110 on the flange 35. Said engaging surfaces provide radial support for the drive plate 34 and attached jaw head, and also provides bearing surfaces for the drive plate when it is rotated relative to the shaft 3.

A bolt 26 is then inserted into and through each hole 105 in the adapter plate and hole 28 in the spacer plate, and is in threaded engagement with hole 25 in the peripheral boss 23 on flange 7, to secure the adapter plate to the shaft 3.

Each hole 105 may be countersunk at 31 to allow the head 32 of each bolt 26 to be placed within the confines of the adapter plate 14 thereby preventing the bolts from binding with associated moving elements of the device.

A circular hand wheel 75, Fig. 1, having a concave bowl-like central portion 76, and a hand gripping periphery 77 is provided for manually adjusting the holding mechanism of the device. The bowl-like central portion houses a scroll plate 79, and a jaw head or cap 81, containing movable jaws 83. The body of the jaw head or cap is generally disk shaped and has a central hub 84.

A circumferential groove 85 substantially rectangular in cross section is formed on the back face of the jaw head 81, defining the periphery of the hub and extends outward toward the periphery of the jaw head. A bore 86 is located in the center of the hub, and is of the same diameter as the bore 16 extending through the hub portion 35 of the drive plate 34. Three radially extending slots or channels 87 in spaced relation to each other, are formed in the disk shaped body of the jaw head 81, and extend from the bore 86 in the hub to the periphery of said jaw head; the radial slots open into the circumferential groove 85.

Jaws 83 are positioned within each of the radial slots 87, being slidable therein. The embodiment of Fig. 1 shows the jaws being held in the radial slots by a combination of grooves 88 formed on the walls of the radial slots 87 and a tongue 89 integral between said grooves. This provides an accepted tongue and groove mounting for the jaws which is merely one way of slidably mounting the jaws; others being well known to those versed in the art. The side of each jaw, extending into the opening common to the radial slots and circumferential groove, is formed with a series of teeth 91 thereon and is generally in the form of an Acme type of thread construction. The flank of each of the teeth facing toward the axis of the device is parallel to the axis of the chuck instead of the usual sloping characteristic of the Acme type of design, while the outward facing sides are slanting as is usual. The function of said jaws and the reason for the peculiar configuration of said teeth will be explained in detail hereinafter.

A disk shaped scroll plate 79, Fig. 1, is located within the concave bowl like portion of the hand wheel, and has a plurality of depressions 92 formed about the edge of the face adjacent the inside wall of the hand wheel, defining tongues (not shown) therebetween.

A spiral groove 93, Fig. 1, is formed on the opposite face of the plate defining a spiral land 94. One side surface 95 of the spiral land is formed so as to be parallel with the axis of the device while the other surface 96 diverges outwardly from the axis toward the jaw head 81.

The teeth of the movable clamping jaws 83 are adapted to be in the spiral groove, and upon either a manual rotational force applied to the scroll plate by the hand wheel, or a rectilinear force applied by the drive pins 45, the spiral land and disposed teeth cooperate to move the clamping jaws radially inward in their restrictive channels 87.

The scroll plate and jaws are shown with the land and teeth being perpendicular on one side and slanting on the other side; it is contemplated that these might be slanting on both sides. This would be particularly desirable in event the chuck was to be used for inside as well as outside holding or chucking of a workpiece.

Lugs 97 are formed on the inner edge of the center hole 98 of the hand wheel in spaced relation to each other and extend toward axis of the wheel; the lugs are adapted to be disposed in the depressions 92 formed on the scroll plate.

A plurality of holes 101 located in the hub 84 of the jaw head, and an extension 102 of said holes being threaded and located on the hub portion 35 of the drive plate are adapted to receive elongated bolts 114, which provide a means for securing the hand wheel, with the scroll plate and jaw head housed therein, to the drive plate 34. The hub 84 is of sufficient depth to prevent the hand wheel from being pressed against the wall 20 of the adapter plate, and thereby allows said wheel to be oscillated freely over the outside surface of the jaw head.

In operation, a section of cylindrical pipe or like body is inserted into and through the central aperture 108 of the shaft with the portion on which the work is to be performed, extending through apertures 107 and 16, and extends outward from the jaw head; Fig. 1, showing the chucking device in its no load rest position prior to inserting and securing the pipe to the chuck. The composite driving pins 45 are shown to be forcing the scroll plate 79 toward the jaws 83 resulting in maximum engagement between the teeth and lands of these two elements.

The hand wheel 75 is then rotated in a counterclockwise direction or toward the operator when he is in a position before the machine with the chucking device to his right. The lugs 97 formed on the inner edge of the center hole of the wheel strike against the edge of the depressions 92 on the inner face of the scroll plate 79, and rotate the plate about the hub 84 of the jaw head 81. As the scroll plate is rotated, the inclined contacting surfaces of the spiral land chuck jaws force the jaws 83 to move radially inward, in their restrictive channels, toward the workpiece. Rotation of the hand wheel is continued until the jaws come into contact with the outside surface of the workpiece whereby further rotational movement is resisted by the pressure exerted on the jaws by the surface of the piece. The pressure between the scroll plate and the jaws results in a surface reaction between the slanted contacting surfaces of the spiral land and chuck jaws; the slanting surfaces causing the scroll plate to be forced to move longitudinally to the left over the hub away from the jaws. This causes a gap between the ends of the land and jaw teeth, which at this time are not completely meshed. The scroll plate 79 moving over the hub 84 of the jaw head 81, toward the surface 20 of the adapter plate 14, forces the tail part 49 of each driving pin 45 into the cylindrical bore 48 of the head part 49, whereby the spring 53 is compressed therebetween. The depth of the cylindrical bore 48 is sufficient to receive substantially the entire length of the tail part 49. The relationship between the spiral groove 93 of the scroll plate 79, and the jaw teeth 91, at this point, is shown by dotted lines 121 in Fig. 1, when the scroll plate is against the adapter plate 14.

The hand wheel 75, being free to move within the limits of the depressions 92 on the scroll plate, without disturbing the radial position of the jaws, is then rotated clockwise a slight degree, and then rapidly again counterclockwise. The lugs 97 strike the edge of the depressions, with sufficient force, with hammer like blows, to minutely rotate the scroll plate and thereby exert an additional pressure on the jaws, causing them to grasp the pipe more firmly. This process can be repeated until no additional inward movement of the jaws 83 can be obtained by this means.

The spring assembly in each radial groove 56, during this manual operation, is in a partial state of compression, being sustained in such condition by the end wall 71 of the spring chamber 58, and the pin 61; this relationship being illustrated in Fig. 2. The force exerted by each spring 65 against the pin 61 is equal, and opposite in direction thereby resiliently retaining the drive plate 34 within the adapter plate 14 in the relative position as shown in Fig. 1. The wedge shaped point 54 on the front of the head part 47 of each driving pin 45 is seated centrally within the V-shaped cam 41.

After the workpiece has been secured within the chucking tool by manipulation of the hand wheel 75, the drive mechanism 12 is energized, providing rotational movement for the chucking tool by means of the pinion 11 which is in meshing engagement with the driving gear 9.

The torque delivered to the shaft 3 is transmitted to the adapter plate 14 by means of the bolts 26, and thence to the drive plate 34 by means of the drive pins 45 acting upon the cam surfaces 41. The jaw head or cap 81, being threadingly secured to the drive plate by means of the bolts 114, is rotated by the drive plate 34, and the scroll plate 79 and hand wheel 75 being supported on the jaw head 81, are also rotated therewith.

The pressure exerted between the pins 61 and the springs 65 while being partially compressed, as shown in Fig. 2, provides a coupling which is of sufficient magnitude to overcome any tendency of the adapter plate 14 from shifting radially with respect to the drive plate 34, while transmitting torque to the drive plate and attached jaw head. Therefore, when the drive mechanism 12 rotates the chucking device with no cutting tool being applied to the workpiece, the drive pins 45 remain centrally within the V-shaped cam surfaces 41.

When a cutting tool, such as a pipe threading device is applied to the end of the pipe to perform work thereon, a force in direct opposition to the driving torque is realized, and the drive plate 34 and attached jaw head tends to lag with respect to the shaft 3, and adapter plate 14.

As a result of the application of said cutting tool, one of the pins 61 is carried into its spring channel 58, of groove 56, compressing the associated spring 65, and thereby increases the coupling between the adapter plate 14 and drive plate 34. The opposite pin is carried further into its pin channel 57 and allows the opposite spring 65 to expand. This change in relationship between the drive plate 34 and adapter plate 14 causes the drive pins 45, which are completely compressed and acting as an integral unit, to be slidably engaged by one upward slanting side of the V-shaped cam surfaces 41 which moves the drive pin longitudinally through the hub 16 of the adapter plate 14, thereby forcing the scroll plate 79 to the right, as viewed in Fig. 1, into more complete meshing engagement with the movable jaws 83. Due to the inclination of the contacting surfaces of the spiral land and jaws, the jaws are moved radially inward toward the axis of the chucking tool, and thereby grasp the workpiece more firmly. An analysis of the resultant driving forces transmitted to the drive plate and operating normally to the contacting surfaces of the cam surfaces 41 and drive pins 45, discloses therefore, that there is present one component which tends to sustain rotative motion, and a component whose direction is along the longitudinal axis of the drive pins and toward the jaw head.

The embodiment illustrated shows that the drive plate cam surfaces 41 and the portion of each pin that extends into said cam surfaces have a V-shaped construction; said reason being that for a predetermined direction of rotation, only one face of the surface and pins are operated upon by the several forces resulting from work performed on the cylindrical pipe. It is realized that if the direction of rotation of the drive unit was reversed, the opposite edges of the grooves and pins would function to provide the same result described above. Therefore, the structural and operational characteristics of this device provide a chucking tool that is adapted to operate effectively, notwithstanding the rotational motion of the power source, permitting the same inward gripping action of the jaws in either direction of rotation, thus permitting operation of the device for cutting either right or left hand threads.

When the work on the pipe has been completed, the cutting tool is removed. The driving pins 45 remain pressed against the inclined sides of the cam surfaces 41, spaced from the center thereof, because of the frictional and centrifugal forces present. Said members will remain in this state of equilibrium until an unbalanced force is introduced thereto, which is of sufficient magnitude to overcome the effects of said retaining forces.

This force is obtained and introduced to the device through use of the hand wheel 75 which is rotated whereby the lugs 97 strike against the edges of the depressions 92 on the scroll plate 79. The rotational movement of the scroll plate caused thereby forces the jaws 83 to move radially outward from the workpiece. As the jaws move outward, the teeth 91 thereof become aligned with the spiral groove 93, whereby the scroll plate 79 is capable of further longitudinal movement toward the jaw head 81, and into complete mesh with the jaw teeth 83.

The spring 53 between the head and tail part of each driving pin 45 expands, forcing the tail part 49 to press the scroll plate 79 into complete mesh with the jaw teeth 91. As a result of the expansion of the spring 53 in each drive pin 61, less force is exerted on the inclined sides of the cam surfaces 41 by the head part 54 of each pin 45. The potential energy of the compressed spring 65, being opposite to and greater than the frictional and centrifugal forces, overcomes said forces, and the spring expands outwardly through the channel 58, and forces the pin 61 and attached drive plate 34, in a radial direction with respect to the adapter plate 14, and opposite to the rotative direction of the drive mechanism 12.

The opposite pin 61, associated with the spring 65, that was allowed to expand when the cutting tool was applied, now compresses that spring, whereby potential energy is created therein. When the potential energy of each spring 65 becomes equal, the relative rotation of the drive plate 34 with respect to the adapter plate 14 will be stopped due to the opposing forces on the pins 61. The front 54 of the drive pins slide down the inclined sides of the cam surfaces 41, and when the relative movement between the drive plate and adapter plate has stopped, the wedge shaped point on the drive pins are seated centrally within the cam surfaces 41.

A semi-radial cavity 120 may be formed in the adapter plate 14 to shift the center of gravity to a point adjacent and equally spaced from the radial grooves 56 to enable the adapter plate to assist the springs 65 in re-establishing the elements into their no load relationship.

It will thus be seen that the operation of the hand wheel causes the scroll plate and its jaw controlling land to move away from the jaw teeth decreasing the degree of mesh between the land and the teeth and conditioning apparatus for the subsequent movement of the scroll plate into more complete mesh with the jaw teeth and resultant further closing of the jaws. It is also seen that a rotational force or torque applies a rotational force to the jaws and also a longitudinal force to the scroll plate which force is in turn translated to a radial force on the jaws.

Having thus described my invention I am aware that numerous and extensive departures may be made therefrom without departing from the spirit of the invention which is defined in the appended claims.

I claim:

1. A chucking tool for securing a workpiece including a face plate having movable jaws therein, a scroll plate having a spiral land in intermeshing engagement with teeth on said jaws, means providing rotational movement for said face plate and jaws, comprising a driven member connected to said face plate, a driving member having circumferentially movable means in engagement with said driven member, said means providing a variable coupling between said driven member and said driving member upon a force being applied to said workpiece.

2. A chucking tool for securing a workpiece including a face plate having movable jaws therein, a scroll plate having a spiral land cooperating with teeth on said jaws, means providing rotational movement for said face plate and jaws, comprising a driving plate and a driven plate, means in said driving plate axially coupled to said driven plate, said means being movable in said driving plate longitudinally of said chucking tool upon a force being applied to said scroll plate to increase the coupling between said driving and driven plates, and said driving plate having circumferentially movable means in engagement with said driven plate providing a variable coupling between said driving plate and driven plate upon a force being applied to said workpiece.

3. A chucking tool for securing a workpiece including a face plate having movable jaws therein, a scroll plate having a spiral land in intermeshing engagement with teeth on said jaws, means providing rotational movement for said face plate and jaws, comprising a driving plate in engagement with a rotatable drive, a driven plate connected to said face plate, means in said driving plate in coupling relationship with said driven plate, means secured to said driven plate extending into said driving plate and in engagement with coupling means in said driving plate, said means providing a variable coupling between said driven and driving members dependent upon the resistance offered to said rotatable drive by a force being applied to said workpiece.

4. A chucking tool for securing a workpiece including a face plate having movable jaws therein, a scroll plate having a spiral land cooperating with teeth on said jaws, means for securing said workpiece in said chucking tool, comprising a driving plate connected to a rotatable drive, a driven plate within said driving plate and secured to said face plate, pin means slidably disposed in said driving plate in coupling relationship with said driven plate having an outer head part and an inner tail part, said tail part being slidable within said head part, spring means between said head and tail parts, said tail part being movable to within said head part upon a force being applied to said scroll plate, and said head part being slidable longitudinally through said driving plate by said spring means into coupling relationship with said driven plate, and said driven plate being formed, upon a force being applied to said workpiece, to force said pin means toward said face plate and to move said scroll plate whereby said cooperating land and teeth radially move said jaws toward said workpiece.

5. In a chucking tool for securing a workpiece including a rotatable plate having movable jaws therein, a scroll plate having a spiral land cooperating with teeth on said jaws, means providing rotation for said rotatable plate, comprising a driving plate, a driven plate connected to said rotatable plate and placed within said driving plate, a plurality of apertures in said driving plate, a plurality of cam surfaces in said driven plate in juxtaposition to said apertures, pin means slidably mounted in said apertures having a head part and a tail part, a cylindrical bore in said head part formed to receive said tail part, spring means between said head part and tail part, said tail part being slidable within said cylindrical bore upon a force being applied to said scroll plate, and said head part being movable through said driving member by said spring means into engagement with the cam surfaces in said driven plate, pin means secured to said driven plate and in engagement with circumferentially movable coupling means in said driving plate, said pin means and circumferentially movable coupling means providing a variable coupling between said rotatable plate and said driving plate upon a force being applied to said workpiece, and said pin means in said driving plate being moved toward said rotatable plate by said cam surfaces upon a force being applied to said workpiece and engaging said scroll plate whereby said cooperating land and teeth force said jaws radially toward said workpiece.

6. In a chucking tool for securing a workpiece including a rotatable plate having movable jaws therein, a scroll plate having a spiral land cooperating with teeth on said jaws, a driving plate, a driven plate connected to said rotatable plate and placed centrally within said driving plate, said driving plate having at least one aperture with pin means slidably mounted therein, said driven plate having at least one cam surface and in juxtaposition to said pin means, said pin means being moved toward said rotatable plate by said cam surface upon a force being applied to said workpiece and engaging said scroll plate whereby said cooperating land and teeth force said jaws radially toward said workpiece, and pin means secured to said driven plate in engagement with coupling means in said driving plate comprising an elongated spring movably disposed in circumferentially formed chanel means, said pin means in said driven plate engaging said spring and providing variable coupling between said rotatable plate and driving plate upon a force being applied to said workpiece.

7. In a chucking tool for securing a workpiece including a rotatable plate having movable jaws therein, a scroll plate having a spiral land cooperating with teeth on said jaws, a driving plate, a driven plate connected to said rotatable plate and placed centrally within said driving plate, said driving plate having at least one aperture with pin means slidably mounted therein, said driven plate having at least one cam surface in juxtaposition to said pin means, said pin means being moved toward said rotatable plate by said cam surface upon a force being applied to said workpiece and engaging said scroll plate whereby said cooperating land and teeth force said jaws radially toward said workpiece, and pin means secured to said driven plate in engagement with circumferentially movable coupling means in said driving plate providing a variable coupling between said driven plate and driving plate upon a force being applied to said workpiece.

8. A device as defined in claim 3, and wherein the said means in said driving plate and in coupling relationship with said driven plate is movably disposed in said driving plate.

References Cited in the file of this patent

UNITED STATES PATENTS 2,693,966  Chasar _____ Nov. 9, 1954